(12) United States Patent
Girard

(10) Patent No.: US 7,073,070 B2
(45) Date of Patent: Jul. 4, 2006

(54) METHOD AND APPARATUS TO IMPROVE THE PROTECTION OF INFORMATION PRESENTED BY A COMPUTER

(75) Inventor: Luke E. Girard, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 904 days.

(21) Appl. No.: 09/895,738

(22) Filed: Jun. 29, 2001

(65) Prior Publication Data

US 2003/0005295 A1  Jan. 2, 2003

(51) Int. Cl.
*G06F 17/00* (2006.01)

(52) U.S. Cl. .................. 713/190; 713/167; 713/166

(58) Field of Classification Search ............... 713/167, 713/193, 190, 166; 725/90; 370/401
See application file for complete search history.

(56) References Cited

U.S. PATENT DOCUMENTS

| | | | |
|---|---|---|---|
| 5,881,287 A | | 3/1999 | Mast |
| 6,034,963 A | * | 3/2000 | Minami et al. ............. 370/401 |
| 6,209,103 B1 | | 3/2001 | Schreiber et al. |
| 6,298,446 B1 | | 10/2001 | Schreiber et al. |
| 6,353,892 B1 | | 3/2002 | Schreiber et al. |
| 6,731,756 B1 | | 5/2004 | Pizano et al. |
| 6,851,055 B1 | * | 2/2005 | Boyle et al. ................. 713/193 |

| | | | |
|---|---|---|---|
| 2001/0052130 A1 | * | 12/2001 | Yap et al. ................... 725/90 |
| 2003/0005295 A1 | | 1/2003 | Girard |

FOREIGN PATENT DOCUMENTS

| | | |
|---|---|---|
| JP | 01 110295 A | 4/1989 |
| WO | WO 02/25416 A2 | 3/2002 |

OTHER PUBLICATIONS

Hank Kuo, "Comparison between the Peripheral Component Interconnect and the Accelerated Graphics Port", 1998, [Retrieved from Internet Feb. 18, 2005], http://www.cs.umd.edu/class/fall2001/cmsc411/projects/agp/pci_vs_agp.htm.*

Network security model for analyzing network-based control systems under denial of service attacks; Long et al.; Industrial Electronics Society, 2004. 30th Annual Conference of IEEE vol. 3, Nov. 2-6, 2004 pp.: 2739-2744 vol. 3.*

Fuzzy control applied to security level analysis; Jun Zou et al.; TENCON '02. Proceedings. 2002 IEEE Region 10 Conference on Computers, Communications, Control and Power Engineering vol. 2, Oct. 28-31, 2002 pp. 825-828 vol. 2.*

(Continued)

*Primary Examiner*—David Jung
(74) *Attorney, Agent, or Firm*—Blakely, Sokoloff, Taylor & Zafman LLP

(57) ABSTRACT

According to one embodiment a method is disclosed. The method includes receiving encrypted video data at a graphics controller from a microprocessor, decrypting the data at the graphics controller and rendering the data.

14 Claims, 4 Drawing Sheets

OTHER PUBLICATIONS

Design of a physical layer security mechanism for CSMA/CD networks; Poon et al.; Communications, Speech and Vision, IEE Proceedings I vol. 139, Issue 1, Feb. 1992 pp. 103-112.*

PCT International Search Report, mailed Feb. 14, 2003, PCT/US01/29692.

Webopedia, Definition of the word "browser", http://www.pcwebopaedia.com, Sep. 15, 2004, pp. 1 total.

Ron White, "How Computers Work", Millennium Edition, part 7, chapter 41, http://www.howcomputerswork.net/index.html, 1999, pp. 5 total.

Safemedia, *SafeImage 1/34 Installation and Users Guide*, chapters 1-4, http://web.archive.org/web/20001014213757/www.safemedia.com/documentation/safeimage, May 13, 2004, pp. 10 total.

* cited by examiner

METHOD AND APPARATUS TO IMPROVE THE PROTECTION OF INFORMATION PRESENTED BY A COMPUTER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention pertains generally to personal computer security. In particular, the invention pertains to protecting electronic documents on a personal computer from unauthorized copying or other harmful intervention.

BACKGROUND

Widespread use of the Internet and electronic mail (e-mail) has left millions of personal computers (PCs) vulnerable to downloaded viruses and other types of malicious software that can destroy programs, copy and upload private documents, and perform other harmful acts, frequently without the PC operator's knowledge. The increasing popularity of downloaded programs has multiplied the problem significantly, since such programs create so many more opportunities to unknowingly download the malicious software.

Due to their open architecture, most PCs provide very little protection against such destructive software. It is this very openness that has made the PC platform the general-purpose solution provider that it is. Other types of computers are also vulnerable to such attacks in varying degrees, but the pervasive use of PCs has drawn much attention to the problem as it applies to PCs.

In the past, owners of copyrighted information or other intellectual property have been reluctant to allow their property to be viewed on the PC platform (books, movies, sensitive corporate documents, etc.) as the nature of the open PC platform makes the property vulnerable to mischievous software that may run in the background. Although self-replicating destructive software (viruses) attracts the most attention, copyright owners are more concerned with the illegal copying and distribution of any document that they permit to be downloaded to a computer. This is particularly true of e-books, or books that are available electronically by downloading the text of those books over a network such as the Internet. The ease of copying documents downloaded into a PC makes it easy to illicitly reproduce and forward copyrighted materials without detection of this activity by the copyright owner.

Typically, protected content in the form of encrypted data is provided (e.g., via the Internet) to a storage subsystem (e.g., main memory, hard disk, etc.), where it is stored for subsequent use. When the data is ready for presentation, it is retrieved from storage and presented to a player for processing. The player is generally software running in the PC. Decryption of the encrypted data can take place in the player, which can also reformat the data. The processed data is then passed to a graphics sub-system, where it is formatted for presentation at a display device, such as a video monitor. Note: although the terms "document" and "display" are used here, this scenario applies equally well to graphics video data and to audio data, such as music, that is played through speakers.

Previous attempts to protect downloaded data have focused primarily on encrypting the data for delivery and storage. However, once the data is decrypted, formatted, and sent to the graphics controller, the bit-image of that data is generally placed in a video memory where the data is repeatedly read out and transmitted to the display device. For reasons of flexibility and usability, the contents of the video memory can generally be read by the PC that implements the player, and by other devices as well. Many graphics controllers also have a secondary interface that also permits both read and write capability of the video memory by other devices, as well as permitting direct transmission of video data.

However, data in the video memory can be captured, and subsequently saved and/or transmitted, for later display in an unauthorized manner. For efficiency of transmission, the offending software that captures the bit-image from video memory may also use the text font maps stored in the PC to interpret the bit image and convert any displayable text back to a standard word processing format. Thus, by using resources freely available in the PC, the supposedly protected data in the graphics controller may be retrieved and stored and/or transmitted to another device, and the retrieved data can be reverse-engineered into a much more compact and usable form before such storage/transmission.

Since many players are in the form of a PC that is vulnerable to modification by maliciously loaded software, this exposure of the graphics subsystem creates a security problem that discourages the use of PCs for any displayable data that needs to be protected, such as copyrighted video material. Once the data is placed in the graphics subsystem, that data is vulnerable to unauthorized monitoring and capture by software that has been illicitly placed in the computer.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
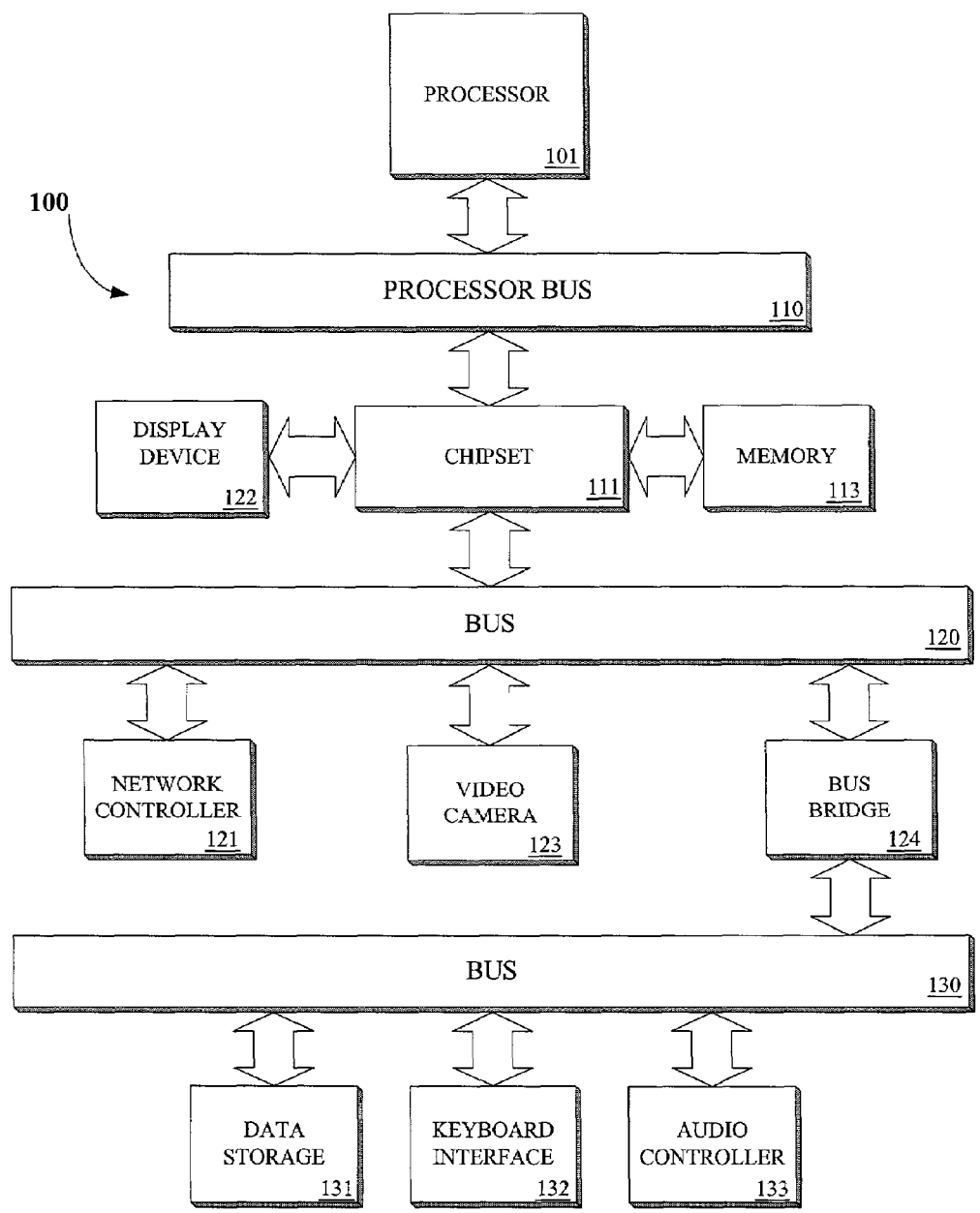
FIG. 1 is a block diagram of one embodiment of a computer system.

A mechanism for protecting rendering and the display of content in a computer system is described. According to one embodiment, electronic documents are protected during transmission between a microprocessor and a graphics sub-system. Further, data is protected from harmful effects during the delivery of electronic documents that are downloaded from a publisher/owner to a computer for display. As a result, unauthorized copying, diversion, modification, destruction, or other harmful effects to the received content can be prevented upon delivery.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 is a block diagram of one embodiment of a computer system 100. Computer system 100 includes a processor 101 that processes data signals. Processor 101 may be a complex instruction set computer (CISC) microprocessor, a reduced instruction set computing (RISC) microprocessor, a very long instruction word (VISW) microprocessor, a processor implementing a combination of instruction sets, or other processor device.

In one embodiment, processor 101 is a processor in the Pentium® family of processors including the Pentium® II family and mobile Pentium® and Pentium® II processors available from Intel Corporation of Santa Clara, Calif. Alternatively, other processors may be used. FIG. 1 shows an example of a computer system 100 employing a single processor computer. However, one of ordinary skill in the art will appreciate that computer system 100 may be implemented using having multiple processors.

Processor 101 is coupled to a processor bus 110. Processor bus 110 transmits data signals between processor 101 and other components in computer system 100. Computer system 100 also includes a memory 113. In one embodiment, memory 113 is a dynamic random access memory (DRAM) device. However, in other embodiments, memory 113 may be a static random access memory (SRAM) device, or other memory device. Memory 113 may store instructions and code represented by data signals that may be executed by processor 101. According to one embodiment, a cache memory resides within processor 101 and stores data signals that are also stored in memory 113. The cache speeds up memory accesses by processor 101 by taking advantage of its locality of access. In another embodiment, the cache may reside external to processor 101.

Computer system 100 further includes a chipset 111 coupled to processor bus 110 and memory 113. In one embodiment, chip set 111 is the 810 chipset available from Intel Corporation; however, other chip sets can also be used. Chipset 111 directs data signals between processor 101, memory 113, and other components in computer system 100. In addition, chipset 111 provides graphics control functions. Chipset 111 is coupled to a display device 122. Display device 122 may be a television set, a computer monitor, a flat panel display or other display device. Display device 122 receives data signals from processor 101 through chipset 111 and displays the information and data signals to the user of computer system 100.

Further, chipset 111 bridges the data signals between processor bus 110, memory 113, and a first input/output (I/O) bus 120. In one embodiment, I/O bus 120 may be a single bus or a combination of multiple buses. In a further embodiment, I/O bus 120 may be a Peripheral Component Interconnect adhering to a Specification Revision 2.1 bus developed by the PCI Special Interest Group of Portland, Oreg. In another embodiment, I/O bus 120 may be a Personal Computer Memory Card International Association (PCMCIA) bus developed by the PCMCIA of San Jose, Calif. Alternatively, other busses may be used to implement I/O bus. I/O bus 120 provides communication links between components in computer system 100.

A network controller 121 is coupled I/O bus 120. Network controller 121 links computer system 100 to a network of computers (not shown in FIG. 1) and supports communication among the machines. A video camera 123 is also coupled to I/O bus 120. Computer system 100 includes a second I/O bus 130 coupled to I/O bus 120 via a bus bridge 124. Bus bridge 124 operates to buffer and bridge data signals between I/O bus 120 and I/O bus 130.

I/O bus 130 may be a single bus or a combination of multiple buses. In one embodiment, I/O bus 130 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 130 provides communication links between components in computer system 100. A data storage device 131 is coupled to I/O bus 130. I/O device 131 may be a hard disk drive, a floppy disk drive, a CD-ROM device, a flash memory device or other mass storage device. A keyboard interface 132 is also coupled to I/O bus 130. Keyboard interface 132 may be a keyboard controller or other keyboard interface. In addition, keyboard interface 132 may be a dedicated device or can reside in another device such as a bus controller or other controller. Keyboard interface 132 allows coupling of a keyboard to computer system 100 and transmits data signals from the keyboard to computer system 100. An audio controller is also coupled to I/O bus 130. Audio controller 133 operates to coordinate the recording and playing of sounds.

Figure 2:
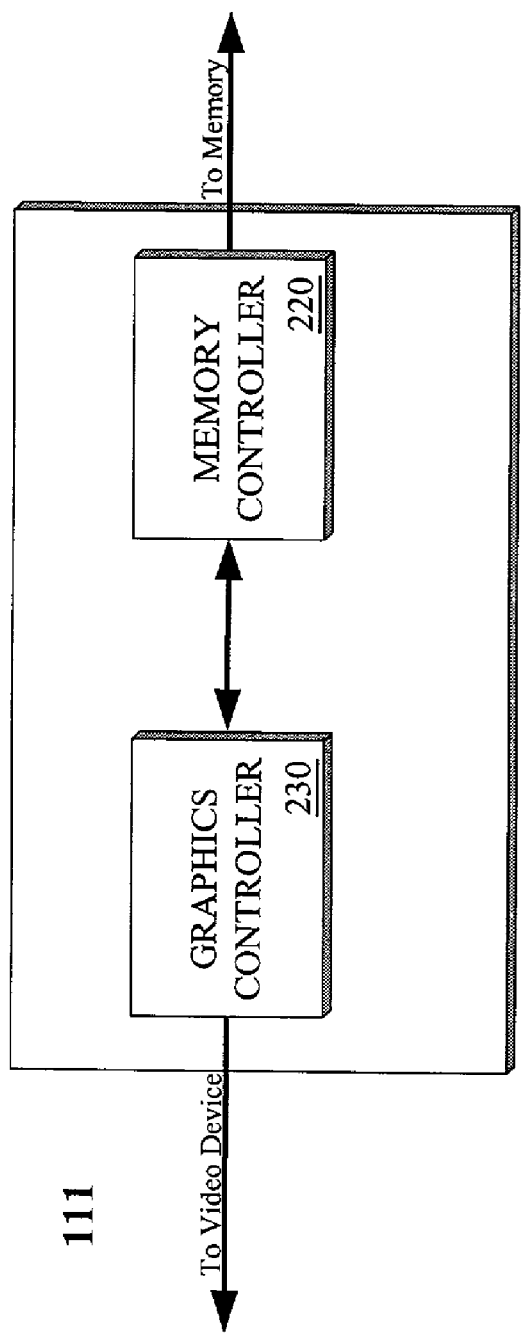
FIG. 2 is a block diagram of one embodiment of a chipset.

According to one embodiment, computer system 100 enables encrypted graphics data to be transmitted to chipset 111 where the data is decrypted and rendered for display. FIG. 2 is a block diagram of one embodiment of chipset 111. Chipset 111 includes a memory controller 220 and a graphics controller 230. Memory controller 220 accesses main memory 113 (FIG. 1) based upon commands received from processor 101, graphics controller 230 and one or more peripheral devices within computer system 100. Memory controller 300 may read data from, and write data to, memory 113.

Graphics controller 230 allows coupling of display device 122 to computer system 100, and acts as an interface between display device 122 and computer system 100. In one embodiment, graphics controller 230 is coupled to display device 122, However, in other embodiments, graphics controller 230 may a monochrome display adapter (MDA) card a color graphics adapter (CGA) card, an enhanced graphics adapter (EGA) card, an extended graphics array (XGA) card or other graphics controllers. In such embodiments, graphics controller 230 may be coupled to bus 120.

Figure 3:
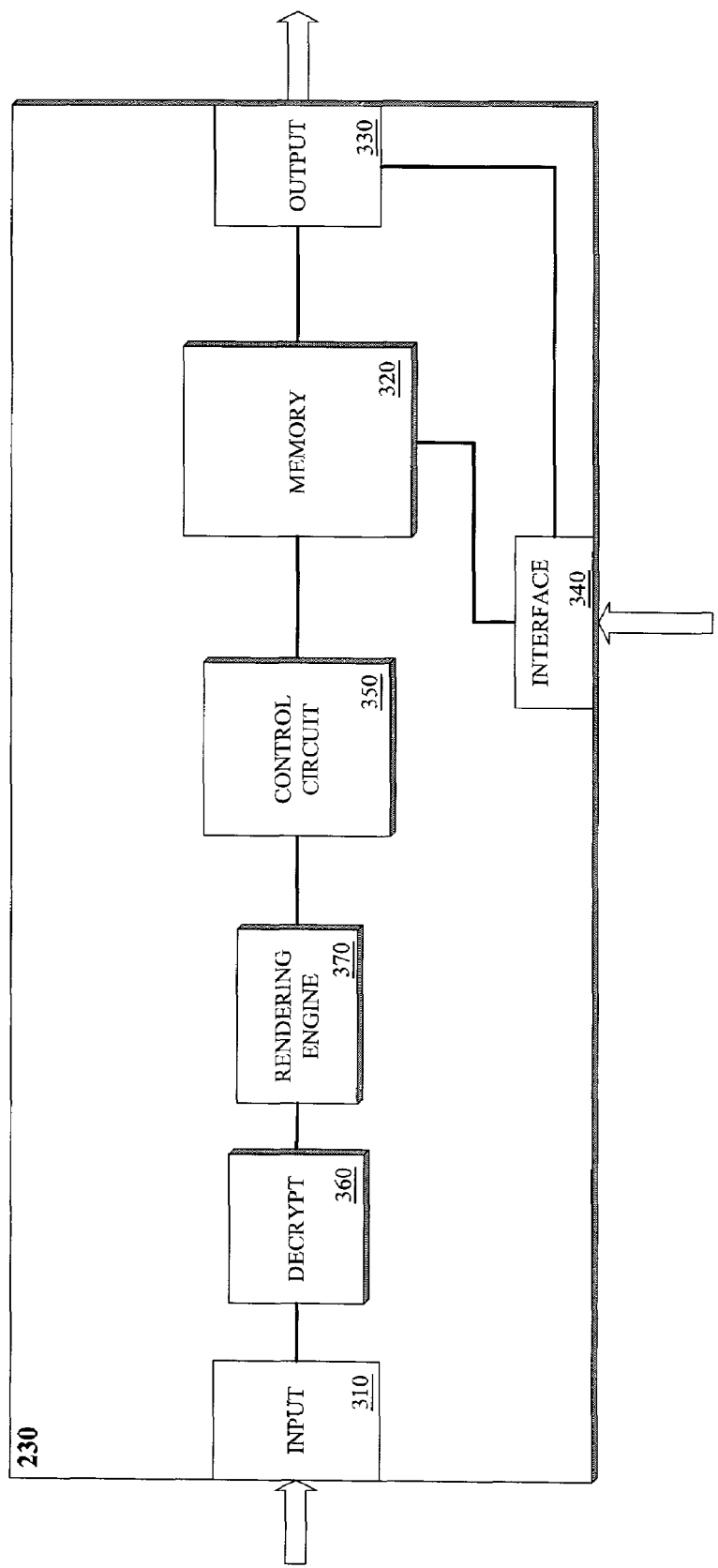
FIG. 3 is a block diagram of one embodiment of a graphics controller.

FIG. 3 is a block diagram of one embodiment of graphics controller 230. Graphics controller 230 includes interfaces 310, 330 and 340. In addition, graphics controller 230 includes a memory 320, a control circuit 350, a decryption module 360 and a rendering engine 370. According to one embodiment, graphics data transmitted from processor 101 to graphics controller 230 is protected against software running in the background that may have unauthorized access to the data.

In conventional computer systems, graphics data that is to be displayed at display device 122 is rendered at processor 101 and transmitted to graphics controller 230 where it is stored in memory 320. However, the data may be pirated by external devices during transmission from processor 101 and graphics controller 230 and while stored within memory 320. In one embodiment, graphics data that is to be rendered is received from a player application (not shown) executed by processor 101 through interface 310 in an encrypted format. For example, when the data is ready for presentation, it is retrieved from storage and presented to a player application for processing. The player is generally software running in the PC.

Decryption module 360 receives encrypted graphics data from the player application, decrypts the data and transmits the data to rendering engine 370. According to one embodiment, rendering engine 370 calculates the layout of pages that are to be displayed. In a further embodiment, rendering engine 370 is an extensible markup language (XML) and hypertext markup language (HTML) renderer that allows easy integration of textual and non-textual data. Further, rendering engine 370 provides typographical as well as graphical support for all kinds of data that can be expressed in XML or properly extending HTML. Nevertheless, one of ordinary skill in the art will appreciate that other types of renderers may be implemented.

Figure 4:
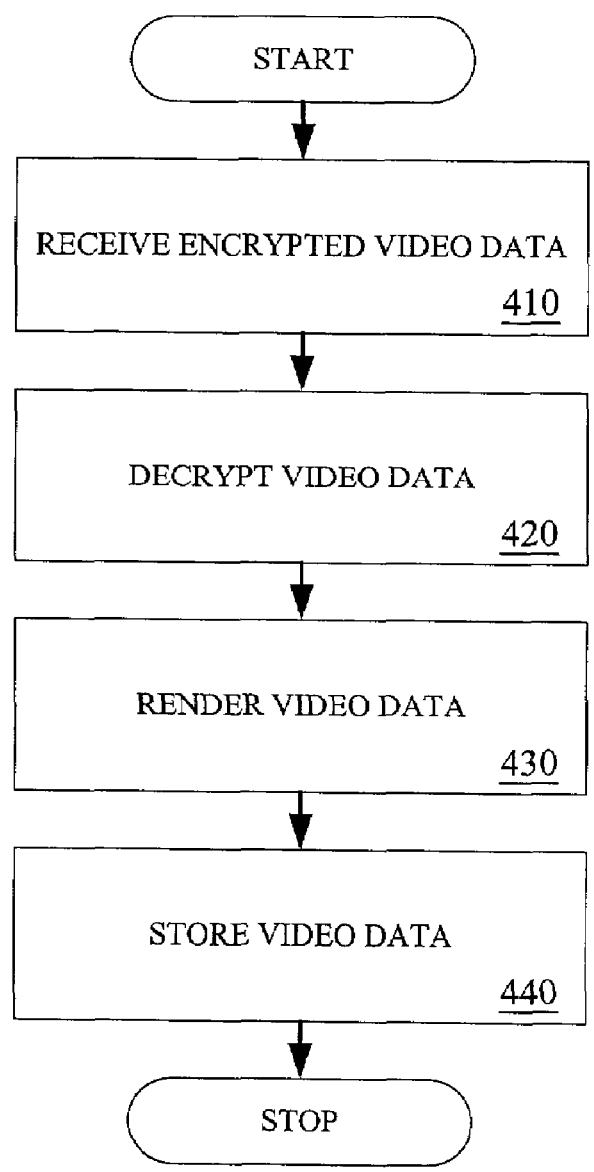
FIG. 4 is a flow diagram for one embodiment of protecting video data transmitted from a player application to a graphics controller.

FIG. 4 is a flow diagram for one embodiment of protecting graphics data transmitted from a player application to graphics controller 230. At process block 410, encrypted graphics data is received at graphics controller 230 from a player application operating at processor 101. At process block 420, the data is decrypted at decryption module 360. At process block 430, the data is rendered at rendering engine 360. At process block 440, the rendered data is stored in memory 320. By rendering the data in graphics controller 370, the data may be decrypted in a secure environment that is protected against software programs that may pirate the data. In addition, graphics controller 370 protects against the unauthorized access of data transmitted from either of interfaces 310 or 340 from memory 320 by pirating software.

Referring back to FIG. 3, memory 320 includes a frame buffer for storing the portion of the stored image that is actually displayed. Data from the frame buffer can then be sent to output interface 330, which sends a properly formatted signal to the display device. In one embodiment, output interface 330 includes a random access memory digital-to-analog converter (RAMDAC), which converts the digitized data into one or more properly formatted analog signals with the specified color rendition. Other types of display devices might require a different output interface to format the data in a different manner, but the overall process within graphics controller 230 is basically the same. A secondary interface 340 can also provide a secondary port to a data channel for data destined for video memory 320, or provide video data directly to output interface 330.

According to a further embodiment graphics controller 230 includes a control circuit 350 to monitor and/or control data flowing between memory 320 and either of interfaces 310 or 340, and to control video memory 320 in a manner that protects secure data stored therein from being illicitly read by devices external to graphics controller 230. Thus, control circuit 350 operates as a gatekeeper between video memory 320 and devices external to graphics controller 230.

In one embodiment, the operation of control circuit 350 is broken down into several functional areas: mode control, security setup, security violation detection, response to violation, and termination. These functional areas are described in more detail below:

Mode Control

In one embodiment, control circuit 350 (and therefore graphics controller 230) has two modes: a security mode and a by-pass mode. In the by-pass mode, the security features of control circuit 350 are by-passed, and graphics controller 230 effectively performs as a conventional graphics controller. In the security mode, control circuit 350 can perform security functions to prevent all or a portion of the contents of memory 320 from being read through interface 310. If interface 340 has a read capability, control circuit 350 may also be coupled to interface 340 in order to prevent memory 320 from being read through interface 340. The mode can be established by one or more commands from the control circuit 350.

In one embodiment, mode commands, other commands, associated addresses and video data can all be input through interface 310 along with other commands and data to be written to video memory. In another embodiment, commands and addresses can be input through one or more separate interfaces (not shown). In one embodiment, the security mode can be entered simply with an external command, but the security mode can be exited only if the secure data is deleted first. This prevents illicit software from simply turning off the security mode so that the protected data can be read with impunity.

Security Setup

Display device 122 in a conventional system frequently shows multiple windows at the same time, some of them overlapping others. Thus, the frame buffer may contain multiple windows, or portions of windows, at any given time. Since all the displayed windows are in the frame buffer, and the frame buffer can be read by external devices in a conventional system, the displayed contents of any window are freely accessible to external devices in a conventional system.

When a copyrighted document or other secure data is being displayed, the window containing that secure data may be only one of several windows that are being simultaneously shown on various parts of the display device. Several of those windows may contain non-secure data that the operator wishes to handle in a standard manner. For example, while viewing portions of a secure copyrighted e-book in one window, the operator may wish to read e-mail or look up an appointment notebook in another window, without having to exit from the e-book application. Therefore the protected portion of the data may be only a subset of the frame buffer, and the secure portion of the data should be defined separately from the remaining displayed data.

In one embodiment, the coordinates of a secure window within the frame buffer are defined. These coordinates can be contained in a set of registers that define opposite corners of a rectangular displayed window, such as the upper left and lower right corners of that window. Any data that is located within this window is considered secure, and can be protected. In one embodiment, one or more sets of registers are dedicated to defining secure windows in this manner.

In another embodiment, existing registers that define a window are temporarily designated as secure registers as long as the defined window contains secure data, but those registers can return to non-secure status once the secure data is automatically deleted and/or the window is closed. In both embodiments, multiple sets of registers can be used to define multiple secure windows, so that the security function can be performed simultaneously on different windows. Note: although the term 'registers' is used here, the invention can also use other forms of data storage to hold the coordinates of the secure windows, such a block of memory containing multiple memory locations. Such obvious design tradeoffs are within the capability of an average circuit designer.

Security registers can be loaded with the coordinates of the secure window by appropriate setup commands passed through interface 310. This assumes interface 310 supports conveyance of a combination of commands and data. Alternately, setup commands can be passed to control circuit 350 through another interface (not shown) specially designated for this purpose. In one embodiment, once these setup commands are entered, the designated security coordinates cannot be altered without deleting the protected data defined by these coordinates. This protects against malicious software that accesses the secure data simply by changing the coordinates of the protected area to another location.

Security Violation Detection

According to one embodiment, the data within the secure window can be treated as write-only data for all devices other than output interface 330 that reads the contents of memory 320, regardless of the register configuration used. All other devices (e.g., devices that can read memory 320 through interfaces 31, 34, or any other accessory ports) are prevented from reading any data in the window defined by the contents of the secure registers. Data in the frame buffer that is outside this defined security window can be read in the normal manner. This effectively prevents the pre-defined secure data in the frame buffer from being illicitly read, copied, or transmitted by malicious software, while not interfering with normal operations for the rest of the data in the frame buffer.

In a further embodiment, detection of an attempted security violation can be accomplished by monitoring the addresses of any requests to read data from memory 320. If the requested address falls between the two stored addresses that define the opposite corners of a protected window, then a violation has occurred. When multiple security windows are defined at the same time, a separate comparison can be made for each secure window. A violation of any secure window can trigger a response.

Response to Violation

The no-read function can be enforced in various ways. In one embodiment, when a device attempts to read data from the secure area defined by the security registers, a data protector in graphics controller 230 will return video data, but not the requested data. The controller might return a solid color for all of the locations in the protected area (such as blue, black, white, etc.). The controller might also return random data, resulting in an image of static. Another option is to return a window with an warning message, alerting the operator to the fact that protected data has been requested.

A second embodiment provides greater protection. In this embodiment, any attempt to read data from the protected portion of memory can result in purging the protected portion of the data by the data protector. This can be done by overwriting the protected data with other data, such as the solid color, random data, or error message described above. This step can be followed by exiting the secure mode, so that the requested window is available for reading, but the secure data is no longer in it. These actions can also trigger other defensive mechanisms, such alerting the operator, deleting the other secure data that is still stored in encrypted form on disk, or severing the connection to the remote source of the secure data. Such drastic actions can prevent alternate, repeated attacks on the secure data by removing the secure data from the system altogether.

Some computer systems, such as laptop PCs, provide an external connector on the graphics controller so that other display devices can be attached. Besides the previously described features, additional protection can be provided by disabling the external graphics connector when secure data is being displayed so that external equipment can't just record the signal.

Termination

When the need to display protected data is over, commands can be issued to control circuit 350 to delete the secure window and/or to change the mode of the affected window from security to by-pass. In either case, the protected data within that window can be purged from memory first so that it cannot be subsequently read by external devices. One or more commands can be implemented that terminate the secure mode in this manner. Alternately, termination can be triggered by simply attempting a read of the protected data, thereby artificially forcing a termination in the manner described above under 'Response to Violation'.

Graphics data that is to be displayed is protected against unauthorized access by external devices by protecting rendering and the display of content. The invention has been described in terms of a frame buffer in a video controller. However, it may be applied to other forms of data presentation. The video controller may be generalized as a presentation controller, which can also take the form of an audio controller that presents downloaded audio information such as music or spoken words. The frame buffer may be generalized as a presentation buffer, which can also take the form of an audio buffer that temporarily stores the audio data to be played, including a combination of protected and non-protected audio data. An embodiment of the invention using audio data can be used to play music or to present an audible e-book for the vision-impaired.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
    receiving encrypted graphics data at a graphics controller from a microprocessor;
    decrypting the data at the graphics controller;
    storing the data in a memory;
    preventing the memory from being read via an input/output interface when the graphics controller is operating in a security mode; and
    rendering the data at the graphics controller.

2. The method of claim 1 further comprising storing the data in a frame buffer after the data has been rendered.

3. The method of claim 2 further comprising decrypting the data at the graphics controller prior to rendering the data.

4. A computer system comprising:
    a microprocessor; and
    a chipset coupled to the microprocessor, wherein the chipset includes a graphics controller comprising a memory to store rendered data, a control circuit to prevent the memory from being read via an input/output interface when the graphics controller is operating in a security mode, and a decryption module to decrypt encrypted graphics data received at the graphics controller.

5. The computer system of claim 4, wherein the graphics controller further comprises a rendering engine to render data received from the microprocessor.

6. The computer system of claim 4 further comprising a display device coupled to the graphics controller.

7. A computer system comprising:
    a microprocessor;
    an input/output (I/O) bus coupled to the microprocessor; and
    a graphics controller coupled to I/O bus, wherein the graphics controller includes a control circuit to prevent a memory from being read via the I/O bus when the graphics controller is operating in a security mode, and a decryption module to decrypt encrypted graphics data received at the graphics controller.

8. The computer system of claim 7 wherein the graphics controller further comprises a rendering engine to render data received from the microprocessor.

9. The computer system of claim 7 wherein the graphics controller further comprises:
    a memory to store the rendered data; and
    a control circuit to control access to the rendered data stored in the memory.

10. The computer system of claim 7 wherein the rendering engine is an extensible markup language (XML) renderer.

11. The computer system of claim 7 further comprising a display device coupled to the graphics controller.

12. The computer system of claim 7 further comprising:
    a chipset coupled to the I/O bus; and
    a processor bus coupled to the chipset and the microprocessor.

13. A graphics controller comprising:
    a decryption module to decrypt encrypted graphics data received at the graphics controller;
    a rendering engine to render the decrypted graphics data; and
    a control circuit to prevent a memory from being read via an input/output interface when the graphics controller is operating in a security mode.

14. The graphics controller of claim 13 wherein the rendering engine is an extensible markup language (XML) renderer.

* * * * *